(12) United States Patent
Patil et al.

(10) Patent No.: US 8,300,578 B2
(45) Date of Patent: Oct. 30, 2012

(54) SYSTEM, APPARATUS AND METHOD FOR SEAMLESS ROAMING THROUGH THE USE OF ROUTING UPDATE MESSAGES

(75) Inventors: Abhishek Patil, San Diego, CA (US); Xiangpeng Jing, San Diego, CA (US); Aixin Liu, San Diego, CA (US); Djung N. Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 205 days.

(21) Appl. No.: 12/535,584

(22) Filed: Aug. 4, 2009

(65) Prior Publication Data
US 2011/0032842 A1    Feb. 10, 2011

(51) Int. Cl.
*H04W 4/00* (2009.01)
(52) U.S. Cl. ............................ 370/328; 455/432.1
(58) Field of Classification Search .......... 370/328–334, 370/338; 455/422.1–460
See application file for complete search history.

(56) References Cited

U.S. PATENT DOCUMENTS

| 7,164,658 | B1 | 1/2007 | Shenoy et al. |
| 7,835,301 | B1 | 11/2010 | Maufer |
| 7,961,674 | B2 * | 6/2011 | Jing et al. ............ 370/328 |
| 8,014,804 | B2 | 9/2011 | Banerjea |
| 8,023,465 | B2 | 9/2011 | Prehofer |
| 2004/0125776 | A1 * | 7/2004 | Haugli et al. ........... 370/338 |
| 2006/0098606 | A1 | 5/2006 | Pandey et al. |
| 2006/0142004 | A1 | 6/2006 | He et al. |
| 2007/0019598 | A1 | 1/2007 | Prehofer |
| 2007/0104215 | A1 | 5/2007 | Wang et al. |
| 2008/0002607 | A1 | 1/2008 | Nagarajan et al. |
| 2008/0192696 | A1 | 8/2008 | Sachs et al. |
| 2008/0205345 | A1 | 8/2008 | Sachs et al. |
| 2008/0267407 | A1 | 10/2008 | Vanderveen |

(Continued)

FOREIGN PATENT DOCUMENTS

EP     1696689     8/2006
(Continued)

OTHER PUBLICATIONS

Raju et al., BOOST: A BOOtSTrapping Protocol for 802.11-based Self-Organizing Hierarchial Wireless Ad-Hoc Networks, http://www.winlab.rutgers.edu~sachin/papers/BOOST.pdf, 2003.

(Continued)

*Primary Examiner* — Man Phan
*Assistant Examiner* — Kevin Lee
(74) *Attorney, Agent, or Firm* — Blakely, Sokoloff, Taylor & Zafman LLP (57) ABSTRACT

According to one embodiment of the invention, a method for managing seamless roaming of a wireless node of a plurality of nodes forming a wireless network comprises detecting, recovering and transmitting operations. The detecting operation involves detecting receipt of a Disassociation message from the wireless node by a first node of the plurality of nodes. The wireless node is roaming and seeking to establish a new communication with a second node of the plurality of nodes. The recovering operation involves addressing information from the Disassociation message by the first node, where the addressing information identifies the second node of the plurality of nodes. The transmitting operation involves transmitting a Route Update message to at least the second node of the plurality of nodes. Other embodiments are described and claimed.

17 Claims, 7 Drawing Sheets

U.S. PATENT DOCUMENTS

| | | |
|---|---|---|
| 2008/0310342 A1 | 12/2008 | Kruys et al. |
| 2009/0221287 A1 | 9/2009 | Balasubramanian et al. |
| 2010/0188971 A1 | 7/2010 | Chiang |
| 2011/0032883 A1 | 2/2011 | Patil et al. |
| 2011/0032913 A1 | 2/2011 | Patil et al. |
| 2011/0075586 A1 | 3/2011 | Hu et al. |

FOREIGN PATENT DOCUMENTS

| | | |
|---|---|---|
| WO | WO 2006-047065 | 5/2006 |
| WO | WO 2006107701 | 10/2006 |
| WO | WO 2007-092931 | 8/2007 |
| WO | WO 2008/029411 | 3/2008 |
| WO | WO 2008/105771 | 9/2008 |

OTHER PUBLICATIONS

Nicholson, et al., "Improved Access Point Selection", http://www.usenix.org/events/mobisys06/full_papers/p233-nicholson.pdf, 2006.

International Application No. PCT/US2010/044440, International Search Report, mailed Feb. 25, 2011.

International Application No. PCT/US2010/044169, International Search Report, mailed Feb. 28, 2011.

International Application No. PCT/US2010/044171, International Search Report, mailed Feb. 9, 2011.

S. Sharma et al., "Dynamic Channel Assignment Protocols for Mobile Networks", Journal of Mobile Communication, vol. 1, Issue 2, 2007, See pp. 70-43.

A. Nasipuri et al., "Multichannel CSMA with Signal Power-based Channel Selection for Multihop Wireless Networks", IEEE VTS, Sep. 2000, See the whole document.

I. Wormsbecker et al., "On Channel Selection Strategies for Multichannel MAC Protocols in Wireless Ad Hoc Networks", IEEE Wireless and Mobile Computing, Networking and Communications, Jun. 19, 2006, See the whole document.

J.Chen et al., "AMNP: Ad Hoc Multichannel Negotiation Protocol for Multihop Mobile Wireless Networks", IEEE International Conference on Communications, Jun. 20, 2004, See the whole document.

U.S. Appl. No. 12/535,595, Notice of Allowance, mailed May 14, 2012.

U.S. Appl. No. 12/535,563, Non-Final Office Action, mailed Apr. 23, 2012.

U.S. Appl. No. 12/535,595, Non-Final Office Action, mailed Dec. 28, 2011.

* cited by examiner

SYSTEM, APPARATUS AND METHOD FOR SEAMLESS ROAMING THROUGH THE USE OF ROUTING UPDATE MESSAGES

FIELD

The invention relates generally to the field of wireless device connectivity. More particularly, one or more of the embodiments of the invention relate to an apparatus and method for managing seamless roaming by tier-2 nodes through the maintenance and exchange of information regarding tier-3 nodes that are being serviced as clients.

BACKGROUND

A wireless network can provide a flexible data communication system that can either replace or extend a wired network. Using radio frequency (RF) technology, wireless networks transmit and receive data over the air through walls, ceilings and even cement structures without wired cabling. For example, a wireless local area network (WLAN) provides all the features and benefits of traditional LAN technology, such as Ethernet and Token Ring, but without the limitations of being tethered together by a cable. This provides greater freedom and increased flexibility.

Currently, a wireless network operating in accordance with the Institute of Electrical and Electronic Engineers (IEEE) 802.11 Standard (e.g., IEEE Std. 802.11a/b/g/n) may be configured in a variety of operating modes such as infrastructure mode and ad hoc mode. As of today, most installed wireless networks are configured and operate in infrastructure mode where one or more access points (APs) are configured as interfaces for a wired distribution network (e.g., Ethernet). In infrastructure mode, mobile devices with wireless connectivity (e.g., laptop computer with a radio network interface card "NIC") are able to establish communications and associate with the AP, and thus, the users of these devices are able to access content within servers connected to the wired network.

As an optional feature, however, the IEEE 802.11 Standard specifies ad hoc mode, which allows the radio NIC within each wireless device to operate in an independent basic service set (IBSS) network configuration. Hence, the wireless devices perform peer-to-peer communications with each other instead of utilizing the AP for supporting such wireless communications.

One type of ad hoc network is referred to as a mesh network, which allows for continuous connections and reconfiguration around broken or blocked paths by "hopping" from device to another device until the destination is reached. Mesh networks differ from other networks in that the devices can all connect to each other via multiple hops without an infrastructure (e.g., an AP), and these devices can be mobile or stationary. Related to mesh networks, mobile ad-hoc networks (MANETs) are self-configuring networks of mobile routers, where the routers are free to relocate.

One of the primary disadvantages of conventional mesh networks is their inability to effectively manage roaming devices in a seamless manner. For example, due to their high mobility and ability to enter stand-by mode when not in operation, mobile devices commonly need to disconnect and associate with different APs. Hence, the AP behaves as a proxy for network traffic involving one or more mobile devices so that, from a routing layer (L3) perspective, the AP appears in a mesh routing table as the destination for all traffic directed toward the mobile node. Thus, any traffic between a mobile device and another mobile device that is connected to a different AP will appear in the routing layer as traffic between the two APs. Hence, a scheme is needed to immediately update the mesh routing tables to reflect AP connectivity changes.

BRIEF DESCRIPTION OF THE DRAWINGS

Embodiments of the present invention are illustrated by way of example, and not by way of limitation, in the figures of the accompanying drawings and in which.

DETAILED DESCRIPTION

In the following description, for the purposes of explanation, numerous specific details are set forth in order to provide a thorough understanding of the present invention. It will be apparent; however, to one skilled in the art that present invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. In other instances, well-known structures and devices are not shown in block diagram form in order to avoid obscuring the details of the disclosed features of various described embodiments.

System Architecture

In the following description, certain terminology is used to describe certain features of the invention. For instance, the term "node" is generally defined as an electronic device with data processing and wireless communication capabilities. An ad hoc network may be formulated as "OEM-specific," meaning that access is restricted to those wireless nodes that are manufactured and/or endorsed and/or sold by the same entity or a group of entities. For instance, an example of an OEM-specific wireless mesh network (WMN) is a network that comprises a Sony® BRAVIA® digital television in communications with a Sony® Playstation 3® game console, a Sony® VAIO® computer, a Sony® handheld device, or any of Sony® based products with networking capability.

Herein, there are two general types of nodes. A first type is a "mesh node" that is specifically adapted to join and become a member of an OEM-specific ad hoc network such as an OEM-specific WMN. The second type is a "non-mesh node" that is only able gain access to an OEM-specific WMN indirectly through a mesh node. Such access may be through wireless or wired communications. For the scope of this invention, the term "node" shall constitute a "mesh node" and the terms "WMN" or "WM network" shall constitute an OEM-specific WMN.

The term "logic" is generally defined as hardware and/or software configured to perform one or more functions. One example of a certain type of logic is a radio network interface card (NIC) that features a wireless chipset being one or more integrated circuits operating to transmit and/or receive signals in order to access a wireless network initiated through an association message. "Software" is generally describes as a series of executable instructions in the form of an application, an applet, or even a routine. The software may be stored in any type of machine readable medium such as a programmable electronic circuit, a semiconductor memory device such as volatile memory (e.g., random access memory, etc.) and/or non-volatile memory such as any type of read-only memory (ROM) or flash memory, a portable storage medium (e.g., USB drive, optical disc, digital tape), or the like.

The term "message" represents information configured for transmission over a network. One type of message is a frame that is generally defined as a group of bits of information collectively operating as a single data unit. The term "content" represents video, audio, images, data, or any combination thereof.

Figure 1:
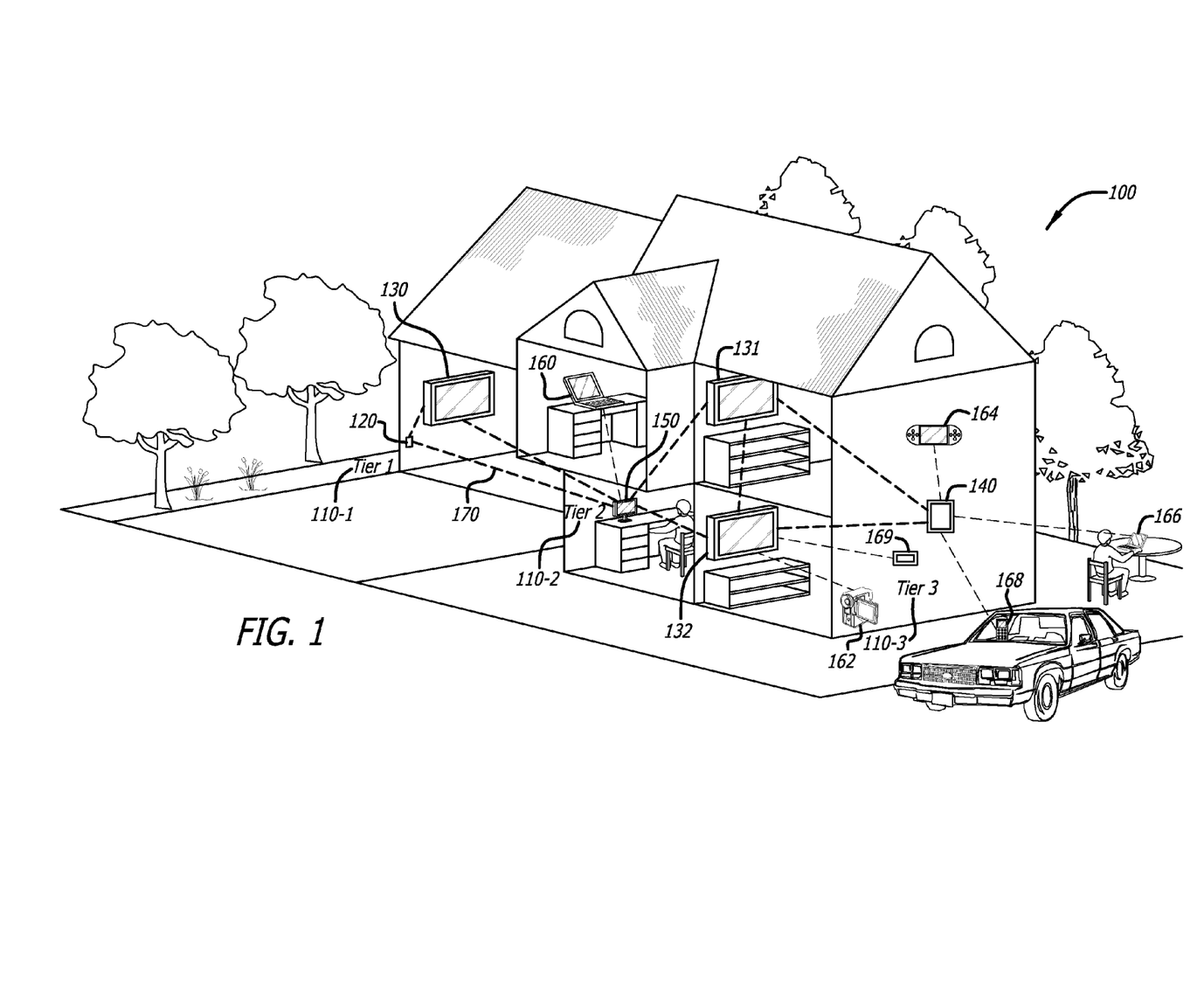
FIG. 1 is a block diagram illustrating an embodiment of a three-tier wireless ad hoc mesh network (WMN).

Referring to FIG. 1, an exemplary embodiment of a multi-tier wireless mesh network 100 is described. Multi-tier wireless mesh network (hereinafter referred to as "WMN" or "WM network") 100 comprises a collection of nodes that operate as a decentralized, wireless mesh network with multiple (M≧1) sub-networks $110_1$-$110_M$ (hereinafter singularly referred to as "tiers"). Mostly every node of WM network 100 is configured to forward data to other nodes and is assigned to a specific tier based on its performance capabilities and power constraints. The assignment of a node to a tier is a decision based at least partially on performance capabilities of the node, whereas routing decisions are made by the nodes based on the network connectivity and the ability to forward data by that particular node.

For instance, one embodiment of WM network 100 features a hierarchical architecture comprising three (3) tiers that are assigned based on the capabilities of the OEM-specific node. A first tier ("tier-1") $110_1$ is responsible for establishing and controlling access to an external network such as the Internet. For example, first tier $110_1$ may resemble a traditional Internet connection via a cable or direct subscriber line (DSL) connection or 3G/WiMax/Outdoor mesh. As illustrated, first tier $110_1$ comprises a first node 120, which is commonly referred to as a "gateway node." Gateway node 120 may include, but is not limited or restricted to a cable or DSL modem, a wireless router or bridge, and the like. Although not shown, multiple gateway nodes may be present within WM network 100 in order to provide multiple communication paths to external network(s).

A second tier ("tier-2") $110_2$ of WM network 100 may represent a wireless network backhaul that interconnects various stationary (fixed-location) OEM-specific wireless nodes adapted for communicating over a wireless communication medium such as, for example, radio frequency (RF) waves.

As described herein, a stationary wireless "tier-2 node" includes, but is not limited or restricted to: a flat-panel television 130, 131, and 132, a gaming console 140, computer 150, or any other device with wireless capability that is usually stationary and is electrically coupled to an alternating current (AC) power outlet. Hence, tier-2 wireless nodes are not subject to power constraints that are usually present in tier-3 nodes where power usage is minimized to extend battery life between recharges.

As shown, computer 150 is adapted to operate in two modes simultaneously. As a wireless mesh node, it can wirelessly communicate with other mesh nodes using the appropriate mesh protocol and be configured by users to join one existing WMN. As a non-mesh node, it can communicate with wireless non-mesh nodes with Ethernet and/or WiFi network cards that are produced by a different manufacturer, to allow them accessing WM network 100 using the standard IEEE 802.11 or Ethernet protocol. Effectively, it enables a non-mesh node access to contents and resources on WM network 100. For instance, flat-panel television 131 may use its WiFi radio (IEEE 802.11a/b/g/n) to associate with computer 150 and effectively access WM network 100. This is accomplished by television 131 associating to the computer's wireless SSID (where computer 150 appears to be an Access Point "AP" for the non-mesh nodes). Also, computer 150 allows the wired non-mesh nodes to associate with and join WM network 100. More specifically, a wired non-mesh node 155 (e.g., facsimile machine) can connect to computer 150 by using a standard Ethernet cable. In both cases, such connectivity may be accomplished without any additional hardware or software modification.

Referring still to FIG. 1, a third tier ("tier-3") $110_3$ of WM network 100 may include links between a node belonging to second tier $110_2$ and one or more mobile "tier-3" nodes (160, 162, 164, 166, 168 & 169). A mobile "tier-3 node" may be any battery powered electronics device with wireless connectivity including, but is not limited or restricted to a laptop computer, portable handheld device (e.g., personal digital assistant, ultra mobile device, cellular phone, portable media player, wireless camera, remote control, etc.) or any non-stationary consumer electronics devices. Since tier-3 nodes normally have resource constraints (e.g., limited power supplies, limited processing speeds, limited memory, etc.), third tier $110_3$ may provide reduced network services. In one embodiment, tier-3 nodes of WM network 100 may act as a slave or child connecting directly to a tier-2 node, which may further limit their functionality within WM network 100.

For this embodiment of the invention, the tier-2 nodes act as proxies for their tier-3 "child" nodes. Thus, all traffic for tier-3 nodes have to go through their tier-2 "parent" (AP) nodes. Therefore, routing tables within the tier-2 nodes needs to have destinations pointing to tier-2 nodes when the final destination is a tier-3 (one of its clients).

Since the traffic on backhaul 170 may include high-definition (HD) video, audio clips and video clips, as well as user data, radio NICs may be incorporated within some of the stationary nodes of the WM network 100. For example, by multiplexing a flow of compressed HD video, multiple Internet video sessions, multiple audio/video sessions and some intermittent http data traffic, the load on backhaul link 170 could reach approximately 60 megabits per second for TCP/UDP type traffic, which may require at least 100 megabits per second of raw radio support considering media access control (MAC) layer efficiency. According to this example, the tier-2 nodes might require an 802.11n type radio (e.g., at 5 GHz band) to meet such bandwidth requirements.

Figure 2:
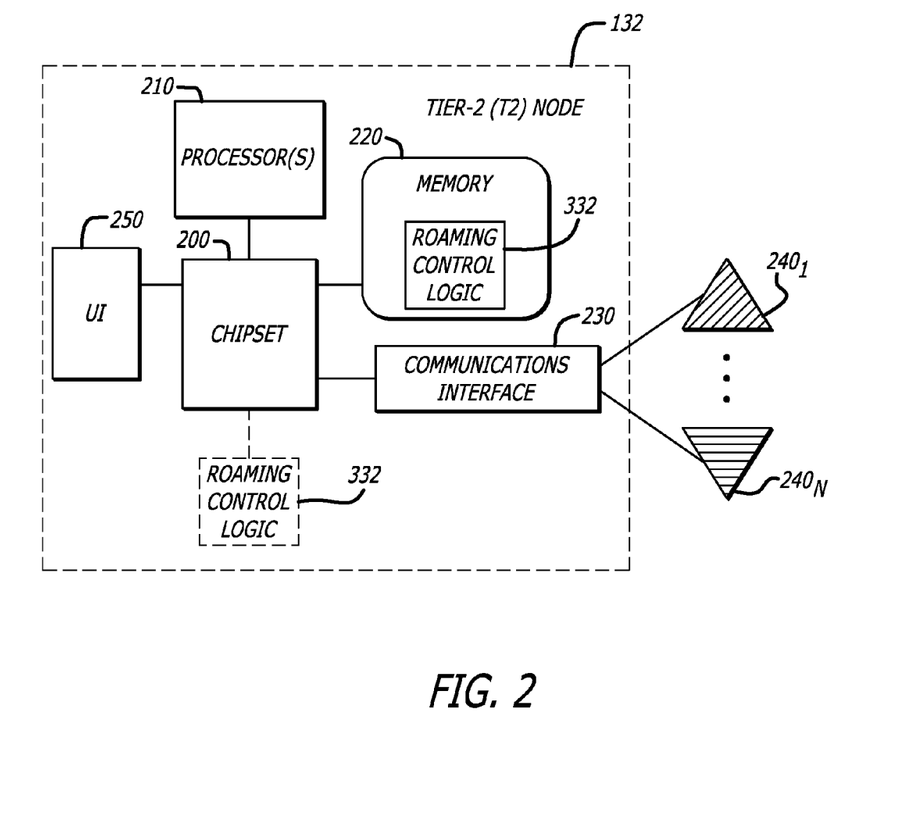
FIG. 2 is a block diagram illustrating an embodiment of a tier-2 node within the WM network of FIG. 1.

Referring now to FIGS. 1 and 2, an exemplary embodiment of tier-2 node 132 is shown. Herein, tier-2 node 132 comprises an embedded wireless network chipset 200 that includes one or more processors 210, memory 220, a communications interface 230 and a user interface (UI) 250. According to this embodiment, processor(s) 210 are adapted to initiate and process Association Request and Disassociation messages to enable a tier-3 node to join/remove itself from WM network 100, as well as Route Update messages to advise other tier-2 and/or tier-1 nodes within WM network 100 of routing changes. These messages are received and transmitted over communications interface 230, which may include one or more antennas $240_1$-$240_N$ ($N \geq 1$) that are controlled by processor 210 or dedicated circuitry (not shown), which is responsible for tuning to a particular wireless channel in order to receive incoming wireless signals and transmit outgoing wireless signals to other nodes over that particular channel.

As shown, flat panel television 132 is adapted to communicate with other tier-2 and tier-3 nodes (e.g., computer 150, digital camera 162, etc.) and that is already part of WM network 100. After an association is established, flat panel television 132 can exchange data with the associated nodes such as a Route Update message, which transmitted to one or more tier-2 nodes (e.g., flat panel televisions 130-131, computer 150) and possibly tier-1 node(s). The route update messages are transmitted when a new tier-2 node joins the mesh network. They are also transmitted in response to an Association message received by a new client (e.g., digital camera 162) and/or a Disassociation message received from a current tier-3 node that is now establishing a new connection with another tier-2 node as described below.

Figure 3:
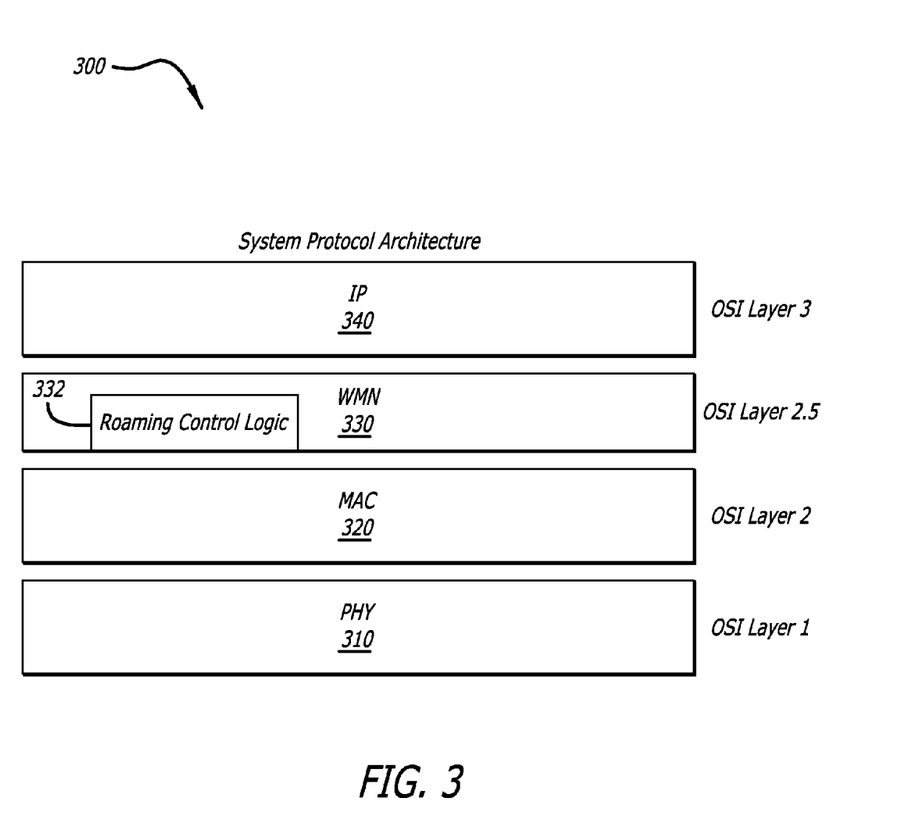
FIG. 3 is a block diagram illustrating an embodiment of a wireless mesh network protocol architecture.

As representatively shown in FIG. 3, in the protocol architecture 300 for a tier-2 node, logic associated with wireless mesh network ("WMN") functionality 330 are placed between MAC layer 320 and network (IP) layer 340 to provide a solution that is independent of the higher OSI layers deployed and can be more easily reconfigured. Hence, WMN layer 330 generally constitutes an "OSI layer 2.5" solution. The placement of WMN layer 330 provides enhanced functionality that is transparent to both lower and higher OSI layers.

In one embodiment, WMN layer 330 can perform functions of WMN software organization and configuration such as roaming control logic 332 for example. According to this embodiment of the invention, roaming control logic 332 is adapted to manage the seamless roaming of tier-3 nodes by using a Route Update message from the tier-2 node to other tier-1 and/or tier-2 nodes. As described below, the Route Update message is configured to identify a change in destination for a particular tier-3 node and prompts updating of a routing table to list a new tier-2 node that is now considered to be the destination for the particular tier-3 node. The Route Update message is in response to a Disassociation or Association message.

Referring back to FIG. 2, roaming control logic 332 may be implemented as software and stored within memory 220 or, as an alternative, may implemented within a programmable circuit coupled to chipset 200 as represented by dash lines. As yet another alternative embodiment, the functionality of roaming control logic 332 may be implemented within chipset 200 or processor 210 of FIG. 2

WM Message Formats

Figure 4:
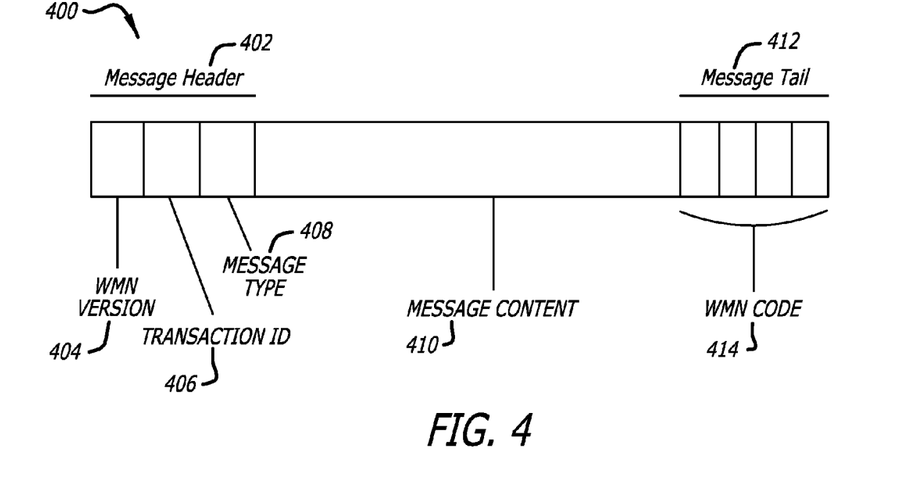
FIG. 4 illustrates an exemplary format of a WMN message 400 that represents a messaging format that nodes use for communications with other nodes within the WM network of FIG. 1.

FIG. 4 illustrates an exemplary format of a WMN message 400, which is representative of a messaging format that nodes use for communications with other nodes within WM network 100 of FIG. 1. More specifically, as shown in FIG. 4 as an illustrative embodiment, WMN message 400 comprises (i) a message header 402, (ii) message content 410, and (iii) a message tail 412.

Herein, according to this exemplary embodiment, message header 402 includes a WMN version 404, a transaction (message) ID 406 and a type parameter 408. WMN version 404 is configured to identify the particular version of software supporting the network connectivity. Transaction (message) ID 406 is configured to identify the particular session in which the message is being sent. This is a security mechanism to ensure that messages are not duplicated during a session. Finally, type parameter 408 is configured to indicate a type of message. For instance, each message type for the WMN-based protocol is assigned a unique identifier to facilitate processing of the contents of the message.

Message content 410 is a portion of the message that is adapted to include data such as control information if WMN message 400 is a control message. The data may be encoded to protect the data from interlopers and to ensure that the data is accessible only by the targeted wireless node.

Message tail 412 includes a WMN code 414. In one embodiment of the invention, each WMN message ends with a WMN (mesh) code 414 that may be repeated a predetermined number of times to ensure that an entire message is received without error. If there is an error during transmission, reception or processing of the message, the mesh code received will not match the pre-determined pattern. If this occurs, the entire message is discarded. Other errors in the body of the message may be detected using standard 802.11 frame verification (e.g., CRC).

Figure 5:
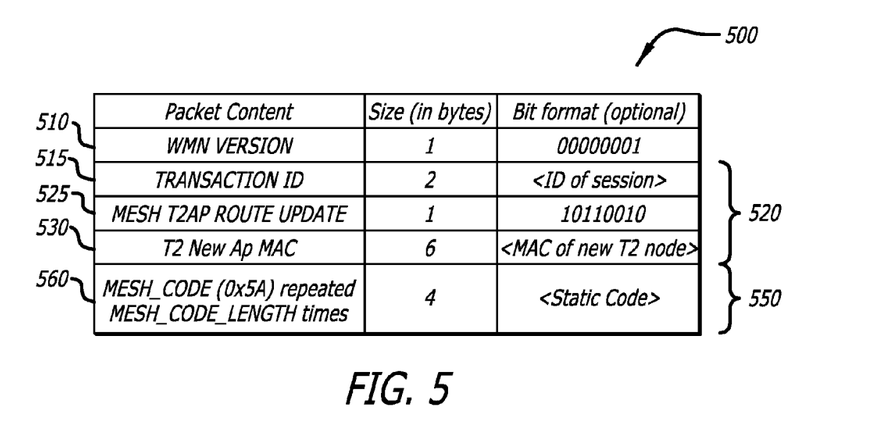
FIG. 5 illustrates an exemplary format of a Route Update message.

FIG. 5 illustrates an exemplary format of a particular type of WMN message, namely a Route Update message 500. Route Update message 500 is a broadcast or multicast message that a node sends out upon detection that one of its associated tier-3 is roaming and will be associating with another tier-2 node within the same WM network.

In particular, Route Update message 500 comprises WMN version 510 and a transaction (message) ID 515 within its header 520. Transaction ID 515 includes a value that generally defines the particular session (or transaction) that the messages are directed. In addition, with respect to Route Update message 500, there are two unique fields: Mesh T2AP Route Update field 525 and T2 New AP MAC field 530. Mesh T2AP Route Update field 525 is a unique identifier that is used to identify that the message is a Route Update message. This facilitates processing of the data within message content 540 of Route Update message 500. T2 New AP MAC field 530 includes a Media Access Control (MAC) address of the tier-2 node that the tier-3 node associated with (after completing roaming). The MAC address is used to update routing tables in the tier-1 and tier-2 nodes of the WM network.

Message tail 550 includes a WMN code 560, which helps in detecting errors during transmission of message 500.

System Functionality

Figure 6A:
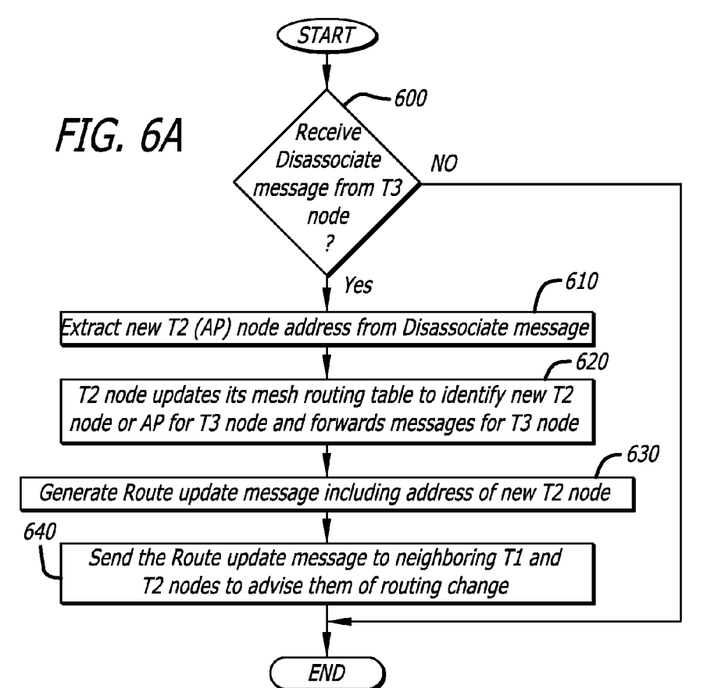
FIG. 6A illustrates an exemplary embodiment of a message flow diagram associated with receipt of a Disassociation message.
Figure 6B:
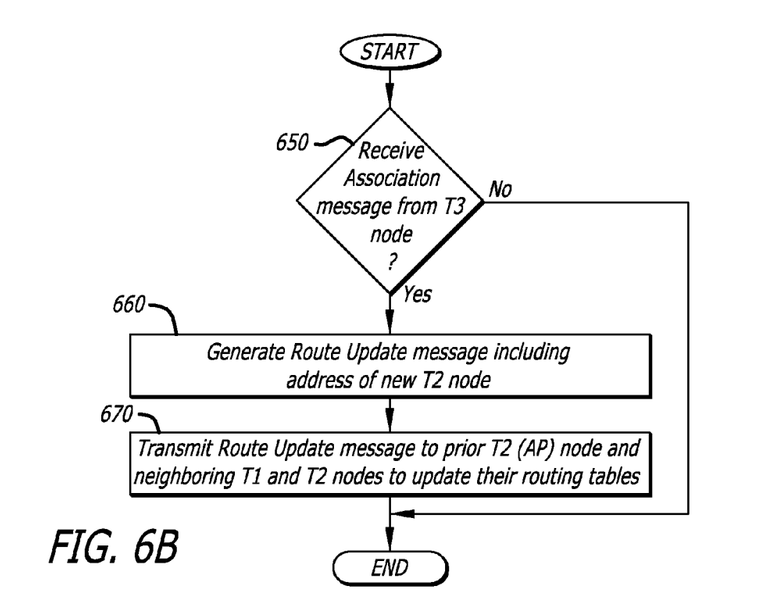
FIG. 6B illustrates an exemplary embodiment of a message flow diagram associated with receipt of an Association Request message.
Figure 7A:
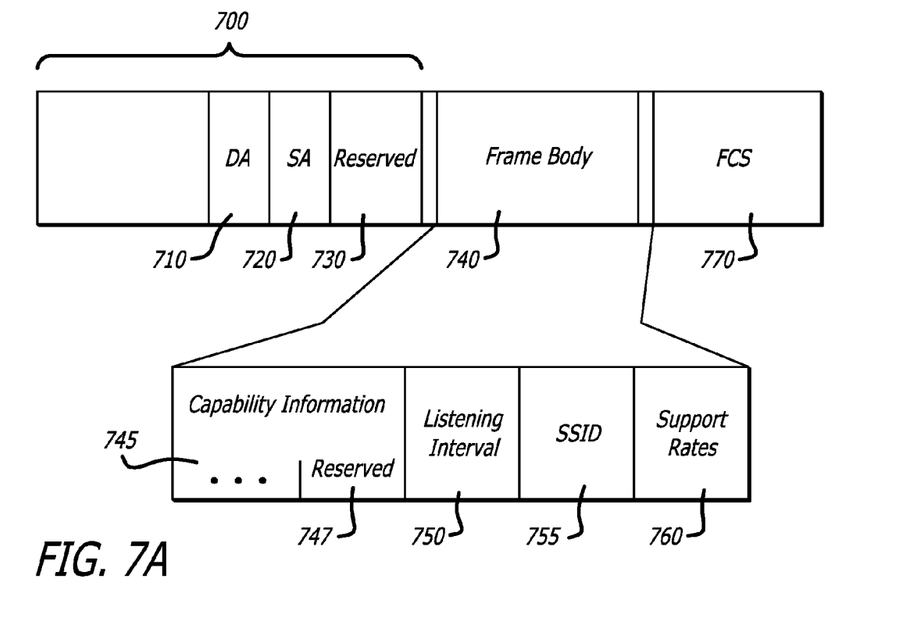
FIG. 7A illustrates an exemplary embodiment of a message format for an Association Request message.
Figure 7B:
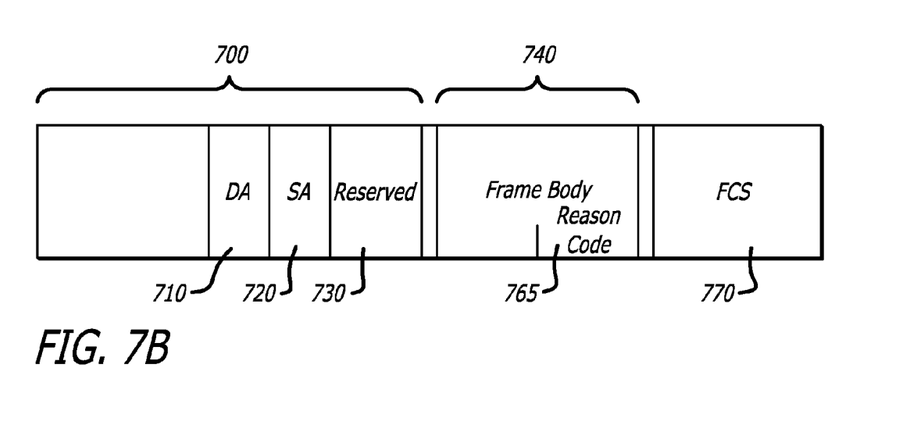
FIG. 7B illustrates an exemplary embodiment of a message format for a Disassociation message.

FIGS. 6A and 6B illustrate embodiments of a message flow diagram 600, performed by a wireless tier-2 node operating as an AP, in response to particular management frames such as an Association Request message or a Disassociation message as illustrated in FIGS. 7A and 7B, which are configured in accordance with a proprietary messaging format that is based on the IEEE 802.11 Standard. Each of the management frames includes a MAC header 700, a frame body 740 and a frame check sequence (FCS) 770. FCS 770 is used for error detection in the transmission of the message.

MAC header 700 comprises a destination address (DA) 710 and a source address (SA) 720. Destination address 710 identifies the MAC address of the tier-2 node that is targeted to receive the message while source address 720 identifies the MAC address of the connecting and/or disconnecting tier-3 node. In addition, MAC header 700 includes a reserved field 730 that, according to this embodiment, is used to include a MAC address of the tier-2 node to which the tier-3 node is intended to newly associate with.

For an Association Request message, frame body 740 includes capability information 745, a listening internal 750, a Service Set Identity (SSID) 755 and support rates 760. Capability information element 745 contains a number of subfields that are used to indicate requested or advertised capabilities of the tier-3 node. Capability information element 745 also includes a reserved element 747 that can be used to include the MAC address of the tier-2 node to which the tier-3 node recently associated. Listening interval element 750 is used to indicate to the AP how often the tier-3 node wakes to listen to beacon management frames. SSID element 755 indicates the identity of the WM network while support rates element 760 indicates the data transmission rates supported by the tier-3 node.

For a Disassociation message, frame body 740 includes a reason code field 765. Reason code field 765 is used to indicate the reason that an unsolicited notification management frame such as the Disassociation message was generated. For instance, per the IEEE 802.11 Standard, Reason code element 765 may indicate that the Disassociation message was to indicate that the tier-3 node is leaving the network (code 8).

Referring back to FIGS. 6A & 6B, upon receiving a Disassociation message from a tier-3 node, the tier-2 node extracts the MAC address for the new tier-2 (T2) node from the Disassociation message (blocks 600 and 610). Thereafter, the tier-2 node updates its mesh routing table to identify that the new tier-2 node is the destination for messaging for that tier-3 node and forwards messages targeted for the tier-3 node to the new tier-2 node (block 620). In addition, the tier-2 node generates a Route Update message that includes the MAC address for the new tier-2 node (block 630). The Route Update message is transmitted as a broadcast or multicast message to neighboring tier-1 and tier-2 nodes so that the recipient nodes update their mesh routing table to identify that the new tier-2 node is the destination for messaging for that tier-3 node, provided the messaging requires transmission between different tier-2 nodes operating as APs (block 640).

For FIG. 6B, upon receiving an Association Request message from a tier-3 node, the tier-2 node generates a Route Update message that includes its MAC address (blocks 650 and 660). Thereafter, the Route Update message is transmitted as a broadcast (or multicast) message to neighboring tier-1 and tier-2 nodes so that the recipient nodes update their mesh routing table to identify that the tier-2 node now is the destination for messaging for the newly associated tier-3 node, provided the messaging requires transmission between different tier-2 nodes operating as APs (block 670). In order to prevent a broadcast storm problem, tier-2 nodes avoids re-broadcasting the same Route Update message. The described protocol supports multicast Route Update messages for scenarios where tier-3 nodes belong to special multicast groups.

Herein, duplicate Route Update messages may be sent to serve as a backup in case the Disassociation message for the previous route update was lost and to ensure that the route information is refreshed when the tier-3 node changes its parent association. Usually, the Disassociation message does not require retry, but the Association message requires retry until the new association is successful.

The protocol defines a "node unavailable" timeout period to handle cases where the tier-3 (client) node is unable to send a Disassociation message, or this message is lost (either due to hard hand-off or since it was abruptly turned off). In case of hard handoff, the tier-3 node is rapidly moved to and associated with another tier-2 node. In such a case, the new tier-2 node would be able to send a Route Update message which will be received by the previous tier-2 node. The (node unavailable) timeout value is defined to be larger than this period. In case where the tier-3 node is abruptly turned off or moves away from the WM network, the parent tier-2 node would detect this case since it would not receive a Route Update for greater than the set timeout period. When this happens, it would send a Route Update indicating that the tier-3 node is completely unavailable. Before the timeout, the original tier-2 node may queue all the packets destined to the tier-3 node and then forward them after new Route Update message is triggered. With such a Route Update message, any traffic meant for the unavailable tier-3 node will be discarded at the source so that the network is not loaded with traffic whose destination is no longer present in the WM network. The timeout value will be implementation specific and should be suitably selected for the desired system.

Figure 8A:
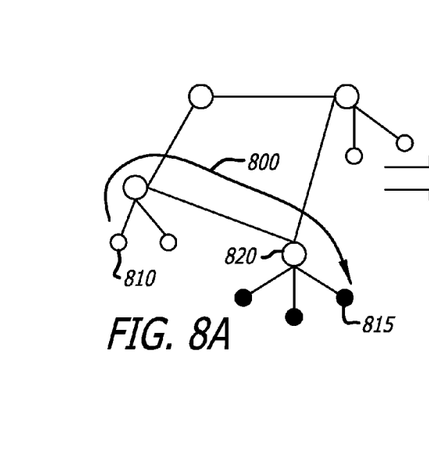
FIGS. 8A-8E illustrate exemplary embodiments of the operations in seamlessly managing the roaming of a tier-3 (T3) node that disconnects from one tier-2 (T2) node and re-establishing a communication with another T2 node of the same WM network.

Referring now to FIGS. 8A-8E, exemplary block diagrams illustrating the operations in seamlessly managing the roaming of a tier-3 (T3) node that disconnects from one tier-2 (T2) node and re-establishing a communication with another T2 node of the same WM network is shown. First, as shown in FIG. 8A, a data path 800 is established between two T3 nodes, namely T3 node 810 and T3 node 815. T3 node 815 is currently associated with T2 node 820.

Figure 8B:
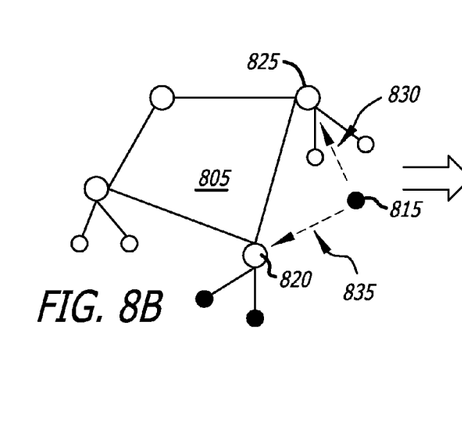
Figure 8C:
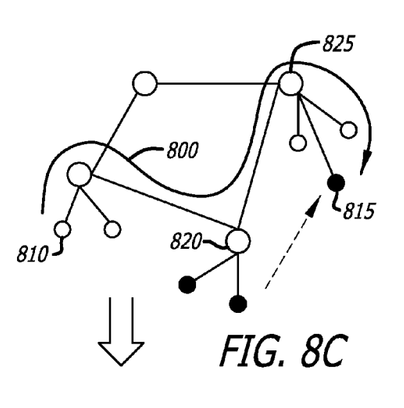

As shown in FIG. 8B, T3 node 815 roams and determines that better communications with network 805 may be established through a different T2 node, namely T2 node 825. Therefore, T3 node 815 transmits an Association Request message 830 to T2 node 825. After successfully receiving an acknowledgement to its association request, T3 node 815 sends a Disassociation message 835 to T2 node 820. To avoid Route Update messages flooding network 805, namely the tier-2 mesh backbone, T2 node 820 withholds transmission of the Route Update message to other tier-2 and/or tier-1 nodes until a first period of time (time period 1) has elapsed from receipt of Disassociation message from T3 node 815. During this transit period, all of the traffic designated to T3 node 815 is routed by T2 node 820 to T2 node 825 as shown in FIG. 8C. As an option, T2 node 825 may also withhold transmission of the Route Update message until a second period of time (time period 2), perhaps less than or equal to the first time period, has elapsed. This will enable network 805 to ensure that communications between T2 node 825 and T3 node 815 are authenticated and stable before transmission of the Route Update message.

Figure 8D:
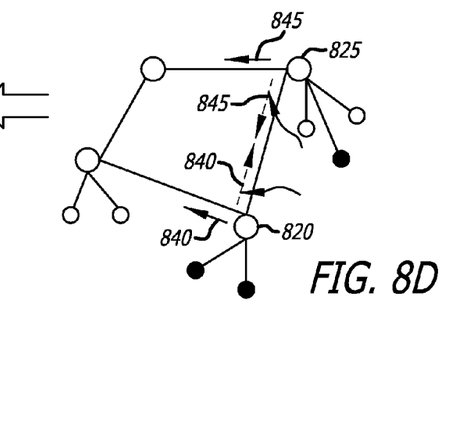
Figure 8E:
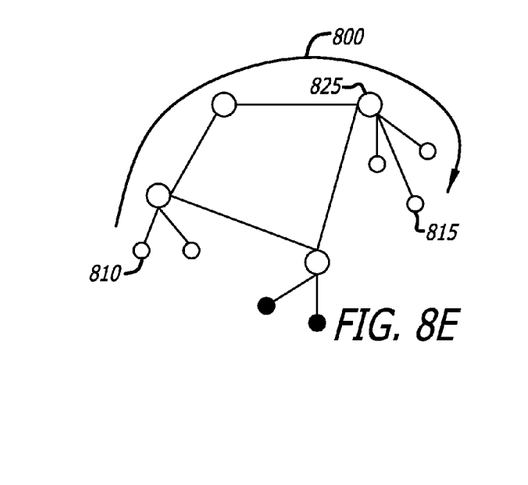

After the period(s) of time has elapsed, as shown in FIG. 8D, Route Update messages 840 and 845 are transmitted from both T2 node 820 and T2 node 825, respectively. As an option, as indicated by dashed lines, Route Update messages 840 and 845 may be transmitted between T2 nodes 820 and 825. Thereafter, after communication path 800 has stabilized, data is transmitted from T3 node 810 to T3 node 815 via T2 node 825 as shown in FIG. 8E.

Having disclosed exemplary embodiments and the best mode, modifications and variations may be made to the disclosed embodiments while remaining within the scope of the embodiments of the invention as defined by the following claims.

What is claimed is:

1. A method for managing seamless roaming of a wireless node of a plurality of nodes forming a wireless network, the method comprising:

detecting, by a first node of the plurality of nodes, receipt of an Association message from the wireless node, the Association message being adapted to establish a new communication path between a second node of the plurality of nodes and the wireless node;

recovering, by the first node, addressing information from the Association message by extracting a media access control (MAC) address of the second node targeted for communications with the wireless node from the Association message; placing, by the first node, the MAC address of the second node within a second message; and transmitting, by the first node, the second message to at least two of the plurality of nodes other than the first node and the second node, the second message being a Route Update message, the Route Update message comprises (i) a transaction identifier that identifies a communication session associated with the new communication path that differs from the current communication path, and (ii) the MAC address of the second node that the wireless node to which the wireless node associates after roaming is completed.

2. The method of claim 1, wherein the Association message is a proprietary Association message that is based on an Association Request message according to an Institute of Electrical and Electronic Engineers (IEEE) 802.11-2007 Standard.

3. The method of claim 2, wherein the recovering of the addressing information comprises analyzing one or more reserved fields within the proprietary Association message.

4. The method of claim 2, wherein Route Update message further comprises (iii) a unique identifier that is used to identify that the second message is a Route Update message.

5. The method of claim 1, wherein the second node of the plurality of nodes is a flat panel television.

6. The method of claim 1, wherein the second node of the plurality of nodes is a gaming console.

7. A method for managing seamless roaming of a wireless node of a plurality of nodes forming a wireless network, the method comprising:

detecting, by a first node of the plurality of nodes, receipt of a Disassociation message from the wireless node, the Disassociation message being adapted to cease a current communication path between the first node and the wireless node in order to establish a new communication path between a second node of the plurality of nodes and the wireless node;

recovering, by the first node, addressing information from the Disassociation message by extracting a media access control (MAC) address of the second node targeted for communications with the wireless node from the Disassociation message; placing, by the first node, the MAC address of the second node within a second message; and transmitting, by the first node, the second message to at least two of the plurality of nodes other than the first node and the second node, the second message being a Route Update message, the Route Update message comprises (i) a transaction identifier that identifies a communication session associated with the new communication path that differs from the current communication path, and (ii) the MAC address of the second node that the wireless node associates after roaming is completed.

8. The method of claim 7, wherein Disassociation message is a proprietary Disassociation message that is based on a Disassociation message according to an Institute of Electrical and Electronic Engineers (IEEE) 802.11-2007 Standard.

9. The method of claim 8, wherein the recovering of the addressing information comprises analyzing one or more reserved fields within the proprietary Disassociation message.

10. The method of claim 9, wherein the transmitting of the second message further comprises
(iii) a unique identifier that is used to identify that the second message is the Route Update message.

11. The method of claim 7, wherein the second node of the plurality of nodes is a flat panel television.

12. The method of claim 7, wherein the second node of the plurality of nodes is a gaming console.

13. A method for managing seamless roaming of a wireless third tier node being a battery powered electronics device with wireless connectivity between a plurality of second tier nodes partially forming a wireless network with one of the plurality of second tier nodes being a flat panel television, the method comprising:

detecting receipt of a first message from the wireless third tier node by a second tier node of the plurality of second tier nodes, the first message being a Disassociation message and being adapted to disconnect communications for the second tier node with, the wireless third tier node during roaming at which time the wireless third tier node is seeking to establish a new communication path with a selected second tier node of the plurality of second tier nodes;

recovering addressing information from the first message by the second tier node by analyzing one or more reserved fields within the Disassociation message, the addressing information identifying the selected second tier node of the plurality of second tier nodes;

placing, by the second tier node, the addressing information extracted from the first message within a second message; and transmitting, by the second tier node, the second message to at least another second tier node of the plurality of nodes other than the second tier node and the selected second tier node, the second message being a Route Update message, the Route Update message comprises (i) a transaction identifier that identifies a communication session associated with the new communication path to be established with the selected second tier node, (ii) a Media Access Control (MAC) address of the selected second tier node that the third tier node is associated with after completing roaming.

14. The method of claim 13, wherein the selected second tier node is a flat panel television.

15. The method of claim 13, wherein the recovering of the addressing information includes extracting a media access control (MAC) address of the selected second tier node from the first message.

16. The method of claim 13, wherein
the Route Update message further comprises (iii) a unique identifier that is used to identify that the second message is the Route Update message.

17. A first wireless electronic device implemented within a network including a second wireless electronic device both operating as an access point in a wireless mesh network, the first wireless electronic device comprising:

a processor; and
a memory coupled to the processor, the memory storing executable instructions that, when executed by the processor, cause the processor to perform operations of
detecting receipt of a first message from a wireless node that is disconnecting a communication path with the first wireless network, wherein the first message being either a Association message or a Disassociation message, recovering addressing information from the first message, the addressing information includes a media access control (MAC) address of the second wireless electronic device, placing the addressing information recovered from the first message within a second message, and transmitting the second message to other wireless electronic devices operating as access points within the wireless mesh network to update routing tables for the other wireless electronic devices, the second message being a Route Update message, the Route Update message comprises (i) a transaction identifier that identifies a communication session associated with a new communication path that differs from the current communication path, and (ii) the MAC address of the second wireless electronic device that the wireless node associates after roaming is completed.

* * * * *